(No Model.)

A. G. WATERHOUSE.
DYNAMO ELECTRIC MACHINE.

No. 318,671. Patented May 26, 1885.

ATTEST:
J. A. Murdle
H. C. Townsend

INVENTOR:
Addison G. Waterhouse

UNITED STATES PATENT OFFICE.

ADDISON G. WATERHOUSE, OF NEW YORK, N. Y., ASSIGNOR, BY MESNE ASSIGNMENTS, TO THE SCHUYLER ELECTRIC LIGHT COMPANY, OF SAME PLACE.

DYNAMO-ELECTRIC MACHINE.

SPECIFICATION forming part of Letters Patent No. 318,671, dated May 26, 1885.

Application filed February 14, 1883. Renewed February 12, 1884. Again renewed March 28, 1885. (No model.)

*To all whom it may concern:*

Be it known that I, ADDISON G. WATERHOUSE, a citizen of the United States, and a resident of New York, in the county of New York and State of New York, have invented certain new and useful Improvements in Dynamo-Electric Machines, of which the following is a specification.

My invention is designed for application to dynamo-electric machines in general, but more particularly to the class in which a ring-armature provided with electrical conductors is made to revolve between two magnetic fields; and more particularly consists of the manner of connecting the armature-conductors and in the method of commutating or taking off the current generated in the same.

Figure 1:
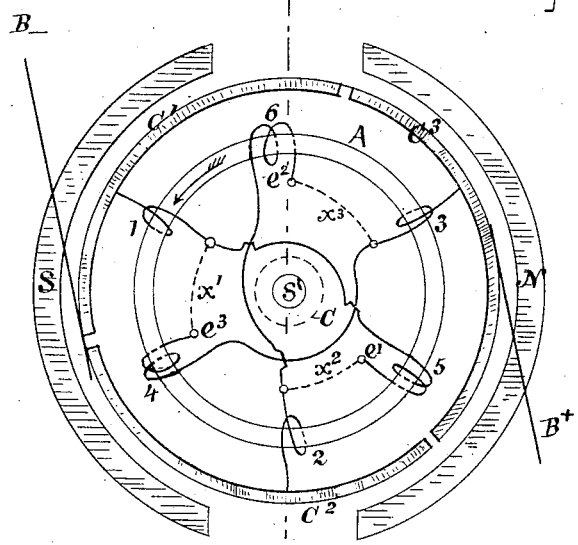
Figure 2:
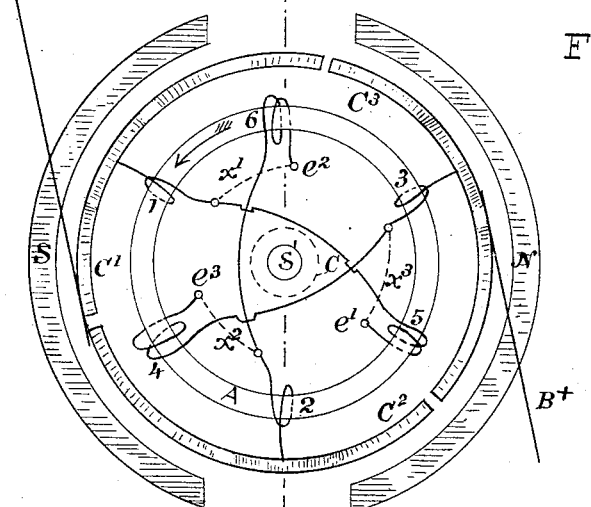

In the accompanying drawings, Figures 1 and 2 show the parts of a generator to which my invention relates, consisting of the field-magnet pole-pieces, (marked S and N,) according to their polarity, the ring-armature A, which rotates upon the shaft S', the electrical conductors wound around the armature, (marked 1 2 3 4 5 6,) and the plates $C'$, $C^2$, and $C^3$ of a three-segment commutator. In the drawings I have shown these plates enlarged to facilitate the following out of the connections; but in practice they are made small, as shown by dotted circle C around the shaft S', and the field-magnet poles S and N are closed in, so as to closely fit around the armature A, and the electrical conductors wound thereon. The two brushes B— and B+ are the ordinary contact-brushes used for carrying on and taking off the current from the commutator-plates $C'$, $C^2$, and $C^3$. The six electrical coils or conductors wound on armature A are all of the same size, and all supposed to be wound in the same direction and to have their inner and outer or first and last ends connected in the following manner:

In order to explain the method of winding and connecting the several coils together electrically, I will begin with commutator-plate C' and follow the wire connected thereto, which first forms the coil 1, thence extending diametrically across the armature A' it forms the coil 5. The inner end of coil 1 is supposed to be connected to the commutator-segment C', its outer or opposite end to the outer end of coil 5, while the inner terminal of the latter coil (indicated at $e'$) is connected, not to a commutator-segment, but by wire $X^2$ to the wire joining another pair of bobbins, 2 6, on opposite sides of the armature. The two bobbins 2 6 are connected in a similar manner to a commutator-plate, $C^2$, and to a wire joining the two bobbins 3 and 4, as follows: The inner end of bobbin 2 is connected to $C^2$, its outer end to bobbin 6, and the inner end, $e^2$, of the latter is connected to the wire joining the bobbins 3 and 4 by a wire, $X^3$. The latter pair is connected also in a similar manner with the inner end of bobbin 3 to commutator-plate $C^3$, and the inner end, $e^3$, of bobbin 4 to the junction between bobbins 1 and 5 by wire X'. The only difference between Figs. 1 and 2 is that the terminals $e'$ $e^2$ $e^3$ are connected by wires X' $X^2$ $X^3$ around to the right in Fig. 1 and to the left in Fig. 2.

In order to explain the electrical action of this generator, I will refer to Fig. 1 and assume that the current enters through the brush B—. It will also be supposed that as the bobbins on A pass the pole N the current produced in such passes with a positive polarity from the inner ends of said bobbins, and with an opposite or negative polarity from the outer ends, while conversely in passing pole S the inner ends of said bobbins will be negative and the outer positive. With this understanding I will describe the electrical action produced when the armature A revolves as indicated by arrow. In its position shown in Fig. 1 the current enters on both plates C' and $C^2$. That which enters on $C^2$ passes around the nearly-neutral coil 2, thence across to coil 6, around it to end $e^2$, along wire $X^3$ to wire leading to coil 3, around this active coil to plate $C^3$, and out through brush B+. That which enters by plate C' passes through active coil 1, thence part of it goes across to active coil 5, thence to and around the inactive coil 6 on wire $X^3$ to active coil 3, to plate $C^3$, and out through B+. The other part, after leaving coil 1, crosses on X' to $E^3$, around active coil 4 across to and around coil 3 to $C^3$ and B+. As the armature A turns slightly around, the plate $C^2$ leaves the brush B— and the neutral coil 2 is cut out. When plate C' alone is in contact with B—, the current all passes in through coil 1. In all cases I get the electro-motive force of three active coils in series, and in cutting out one plate after another have only to open-circuit the single coils 1, 2, and 3 one at a time, which is done at a time when they are passing the neutral line, and the flash produced by such cutting out is reduced to a very limited spark.

In the drawings the vertical dotted line indicates the line upon which the polarity of each bobbin changes theoretically, though in practice, as is well known, the position of this line shifts in the direction of revolution of the armature, the upper end of the dotted line swinging to the left and the lower to the right. It is with reference to this practical neutral line that the commutator-brushes are placed, as shown in the drawings, so as to shift from one segment to another and cut out and bring in a bobbin at practically equal distances on either side of said line.

I do not limit myself to a ring-armature, as the same principle of connection might obviously be applied to a drum or cylinder armature having coils wound over its exterior in the well-known way, or to other and earlier forms of armature. In this application I have only shown three commutator-plates with three pairs of coils; but I do not confine myself to this number, as any number of plates with a corresponding number of coils can be used and connected in the manner above set forth; but in choosing a number it is best to have an odd number of plates and sets of coils, so that the coils without commutator-plates, as coils 4, 5, and 6, will come between the coils which lead to the commutator, as coils 1, 2, and 3.

My invention may be applied to drum or cylinder armatures and to other constructions, as well as to a ring-armature.

What I claim as my invention is—

1. In a dynamo-electric machine, an armature provided with coils of electric conductors arranged in pairs, with one free end of each pair connected to a separate commutator-plate and the other end being connected to the wire that connects the two coils of another pair, substantially as and for the purpose set forth.

2. In a dynamo-electric machine, the combination, with two armature-coils or bobbins arranged in substantially the same armature-plane and connected to work in series, of a connection from the wire joining said coils to one terminal of another pair of bobbins in another armature plane or portion of the magnetic field, the other terminal of said pair being connected to a commutator-segment.

3. In a dynamo-electric machine, an armature provided with pairs of connected coils on opposite sides thereof, one free end of each pair being connected to a commutator-plate, while the other free end is connected to the wire joining the coils in a plane near to that occupied by the first-named pair.

Signed at New York, in the county of New York and State of New York, this 1st day of February, A. D. 1883.

ADDISON G. WATERHOUSE.

Witnesses:
THOS. TOOMEY,
WM. H. BLAIN.